United States Patent
Line et al.

(10) Patent No.: US 10,065,534 B1
(45) Date of Patent: Sep. 4, 2018

(54) VEHICLE SEATS INCLUDING BLADDERS

(71) Applicant: Ford Global Technologies, LLC, Dearborn, MI (US)

(72) Inventors: Johnathan Andrew Line, Northville, MI (US); Daniel Ferretti, Commerce Township, MI (US); Keith Allen Godin, Dearborn, MI (US); Michael Medoro, Livonia, MI (US); Michael Kolich, Windsor (CA); Michael M. Filipovich, West Bloomfield, MI (US)

(73) Assignee: Ford Global Technologies, LLC, Dearborn Heights, MI (US)

( * ) Notice: Subject to any disclaimer, the term of this patent is extended or adjusted under 35 U.S.C. 154(b) by 0 days.

(21) Appl. No.: 15/449,316

(22) Filed: Mar. 3, 2017

(51) Int. Cl.
*B60N 2/36* (2006.01)
*B60N 2/20* (2006.01)
*B60N 2/02* (2006.01)
*B60N 2/90* (2018.01)

(52) U.S. Cl.
CPC .......... *B60N 2/206* (2013.01); *B60N 2/0244* (2013.01); *B60N 2/914* (2018.02); *B60N 2002/0272* (2013.01)

(58) Field of Classification Search
CPC ....... B60N 2/206; B60N 2/0244; B60N 2/914
USPC ... 297/284.6, 452.41, 378.1, 378.11, 378.12, 297/378.13, 378.14
See application file for complete search history.

(56) References Cited

U.S. PATENT DOCUMENTS

| | | | |
|---|---|---|---|
| 5,433,506 A | 7/1995 | Jensen | |
| 5,529,377 A * | 6/1996 | Miller | A47C 4/54 297/284.6 |
| 5,558,398 A | 9/1996 | Santos | |
| 5,879,053 A * | 3/1999 | Lux | B60N 2/01591 297/378.1 |
| 6,199,951 B1 * | 3/2001 | Zeile | B60N 2/3011 297/378.12 X |
| 6,773,048 B1 * | 8/2004 | Freeman | B60N 2/0224 297/378.13 X |
| 6,912,748 B2 | 7/2005 | VanSickle | |
| 7,077,463 B2 * | 7/2006 | Sun | B60N 2/3047 297/378.1 X |
| 7,086,700 B2 * | 8/2006 | Habedank | B60N 2/206 297/378.1 X |
| 7,108,323 B2 * | 9/2006 | Welch | B60N 2/3011 297/378.1 X |
| 7,152,922 B2 * | 12/2006 | Garland | B60N 2/01583 297/378.13 X |
| 7,255,399 B2 * | 8/2007 | White | B60N 2/01583 297/378.12 X |

(Continued)

FOREIGN PATENT DOCUMENTS

| | | |
|---|---|---|
| DE | 8009720 | 7/1980 |
| DE | 4034121 A1 | 10/1991 |
| WO | 9911483 | 3/1999 |

*Primary Examiner* — Rodney B White
(74) *Attorney, Agent, or Firm* — Vichit Chea; Price Heneveld LLP

(57) ABSTRACT

A vehicle includes a seatback defining a loading surface and operable between deployed and undeployed positions. A seat base is positioned proximate the seatback. A bladder is operable between inflated and deflated states. A valve is fluidly coupled with the bladder. Foam is positioned within the bladder. The loading surface is substantially horizontal when the bladder is deflated and the seatback is in the deployed position.

19 Claims, 4 Drawing Sheets

(56) References Cited

U.S. PATENT DOCUMENTS

| | | | | |
|---|---|---|---|---|
| 7,267,406 B2* | 9/2007 | Sturt | B60N 2/3013 | |
| | | | 297/378.1 X | |
| 7,311,358 B2* | 12/2007 | White | B60N 2/01525 | |
| | | | 297/284.1 | |
| 7,942,479 B2* | 5/2011 | Crainic | B60N 2/0296 | |
| | | | 297/378.12 X | |
| 8,708,413 B2* | 4/2014 | Heeg | B60N 2/01583 | |
| | | | 297/378.13 | |
| 8,870,288 B2* | 10/2014 | Heeg | B60N 2/0232 | |
| | | | 297/378.13 | |
| 8,944,504 B2* | 2/2015 | Zimmerman, II | B60N 2/3013 | |
| | | | 297/378.1 X | |
| 9,527,417 B2* | 12/2016 | Dry | B60N 2/525 | |
| 9,550,439 B2* | 1/2017 | Dry | B60N 2/4415 | |
| 9,937,826 B2* | 4/2018 | Dry | B60N 2/914 | |
| 9,981,588 B2* | 5/2018 | Dry | B60N 2/20 | |
| 2004/0222684 A1 | 11/2004 | VanSickle | | |
| 2004/0226098 A1* | 11/2004 | Pearce | A43B 13/04 | |
| | | | 5/655.5 | |
| 2005/0194826 A1* | 9/2005 | O'Callaghan | B60N 2/01583 | |
| | | | 297/378.13 | |
| 2009/0106906 A1* | 4/2009 | Soltani | A61G 7/015 | |
| | | | 5/713 | |
| 2010/0071137 A1* | 3/2010 | Doehler | A61G 7/05715 | |
| | | | 5/713 | |
| 2010/0146709 A1* | 6/2010 | Lafleche | A61G 7/05715 | |
| | | | 5/713 | |
| 2010/0207443 A1 | 8/2010 | Brncick | | |
| 2011/0025111 A1 | 2/2011 | Wornell et al. | | |
| 2012/0241573 A1* | 9/2012 | Koller | F16G 11/146 | |
| | | | 248/220.21 | |
| 2013/0285426 A1 | 10/2013 | Arant et al. | | |
| 2015/0320230 A1* | 11/2015 | Creekmuir | A47C 27/088 | |
| | | | 5/709 | |
| 2015/0335507 A1* | 11/2015 | Emmons | A61G 7/0509 | |
| | | | 5/615 | |
| 2016/0236594 A1 | 8/2016 | Dry | | |
| 2016/0236601 A1 | 8/2016 | Dry | | |
| 2016/0347206 A1* | 12/2016 | Line | B60N 2/7064 | |
| 2017/0043689 A1* | 2/2017 | Dry | B60N 2/4415 | |
| 2017/0043690 A1* | 2/2017 | Dry | B60N 2/4415 | |
| 2017/0066350 A1* | 3/2017 | Dry | B60N 2/64 | |
| 2017/0113580 A1* | 4/2017 | Dry | B60N 2/914 | |

* cited by examiner

US 10,065,534 B1

VEHICLE SEATS INCLUDING BLADDERS

FIELD OF THE INVENTION

The present disclosure generally relates to seats, and more particularly to vehicle seats.

BACKGROUND OF THE INVENTION

Seats which fold in a vehicle may offer an increased surface to store objects and provide access to a trunk space; however, design characteristics of the seat may prevent the seat from lying flat. Accordingly, new seat configurations may be advantageous.

SUMMARY OF THE INVENTION

According to one feature of the present disclosure, a vehicle includes a seatback defining a loading surface and is operable between deployed and undeployed positions. A seat base is positioned proximate the seatback. A bladder is operable between inflated and deflated states. A valve is fluidly coupled with the bladder. Foam is positioned within the bladder. The loading surface is substantially horizontal when the bladder is deflated and the seatback is in the deployed position.

According to feature aspect of the present disclosure, a vehicle includes a seatback operable between deployed and undeployed positions. A seat base is positioned proximate the seatback. A bladder is operable between inflated and deflated states. A valve is fluidly coupled with the bladder. A sensor is configured to detect motion of the seatback and actuate the valve to drive the bladder between the inflated and deflated states.

According to yet another feature of the present disclosure, a method of folding a vehicle seat including the steps of: moving a seatback from an undeployed position to a deployed position; actuating a valve to deflate a bladder within a seat base coupled to the seatback; and latching the seatback in the undeployed position and actuating the valve to seal the bladder.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1A:
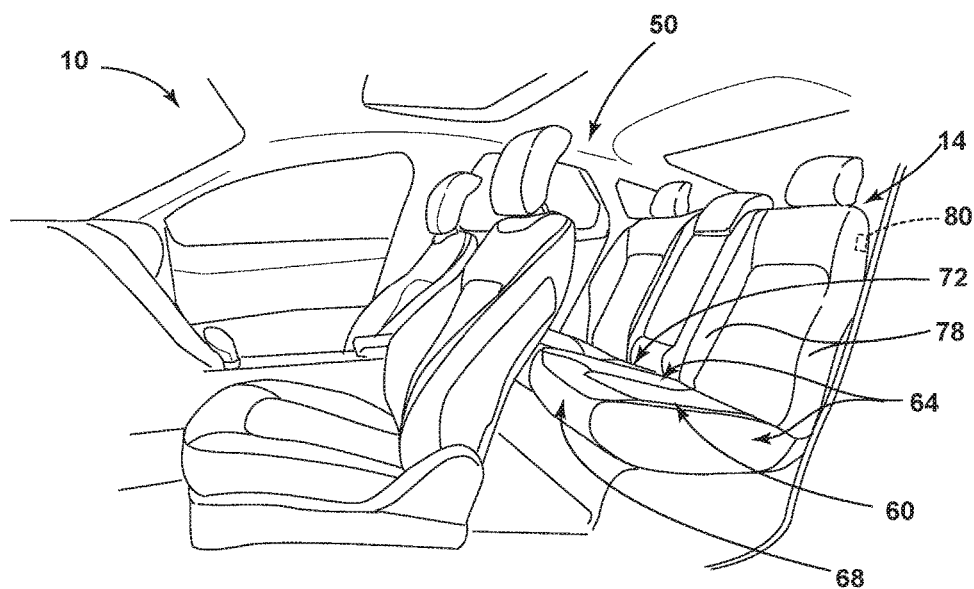
FIG. 1A is a side perspective view of a vehicle seating assembly, according to at least one example.
Figure 1B:
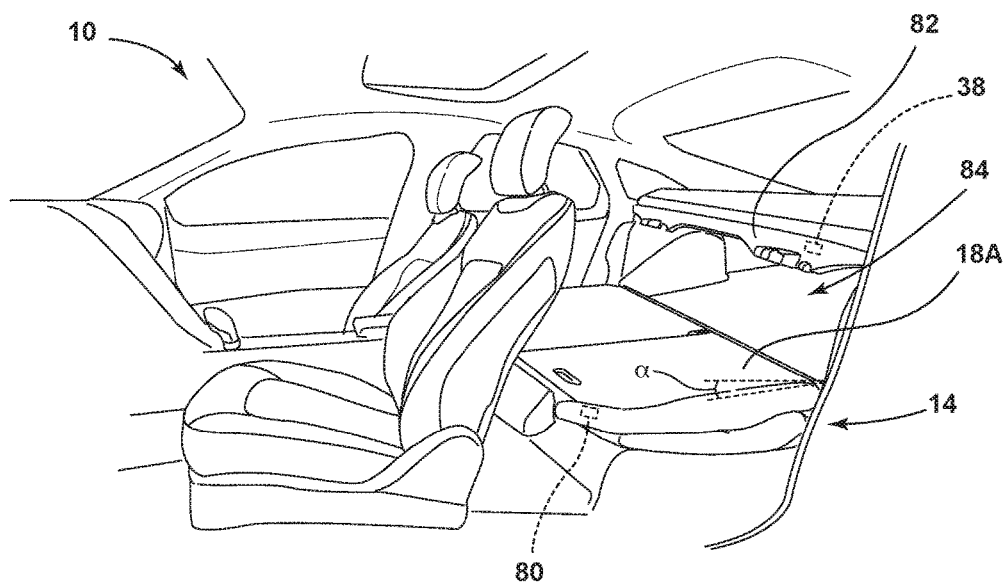
FIG. 1B is a side perspective view of the vehicle seating assembly having a seatback in a deployed positioned, according to at least one example.
Figure 2A:
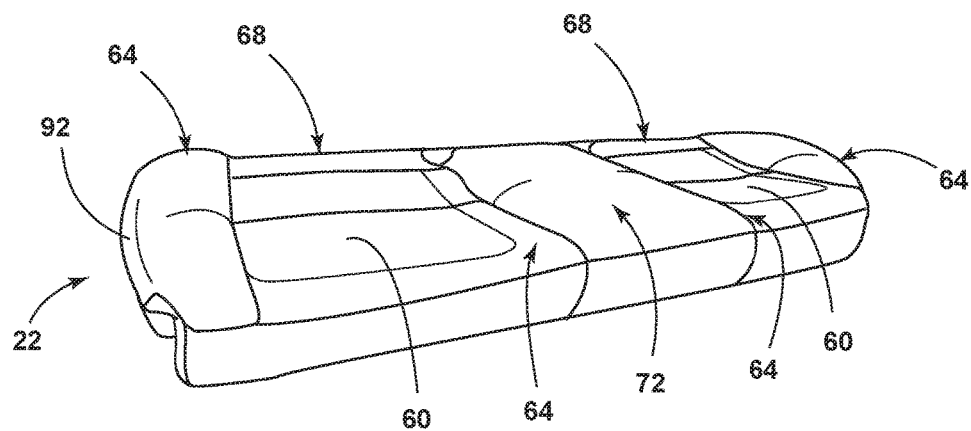
FIG. 2A is a perspective view of a seat base of a seat assembly, according to at least one example.
Figure 2B:
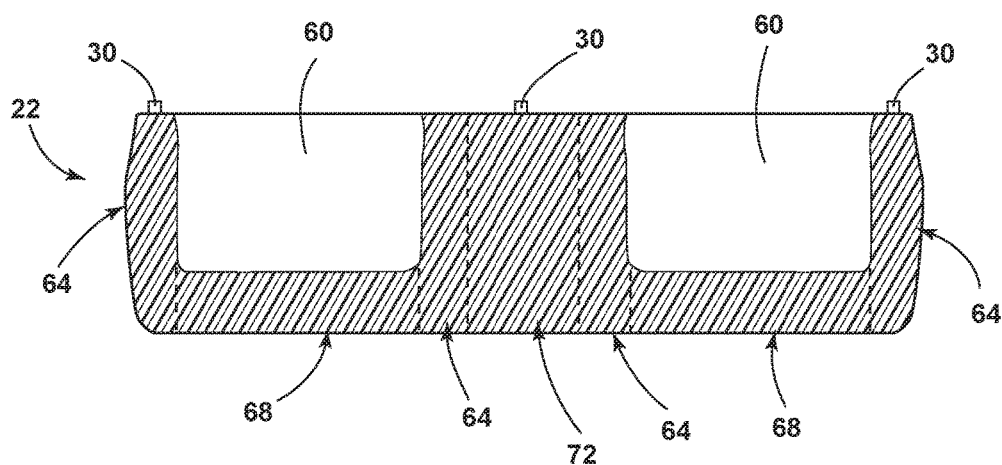
FIG. 2B is a top view of the seat base of FIG. 2A.
Figure 3A:
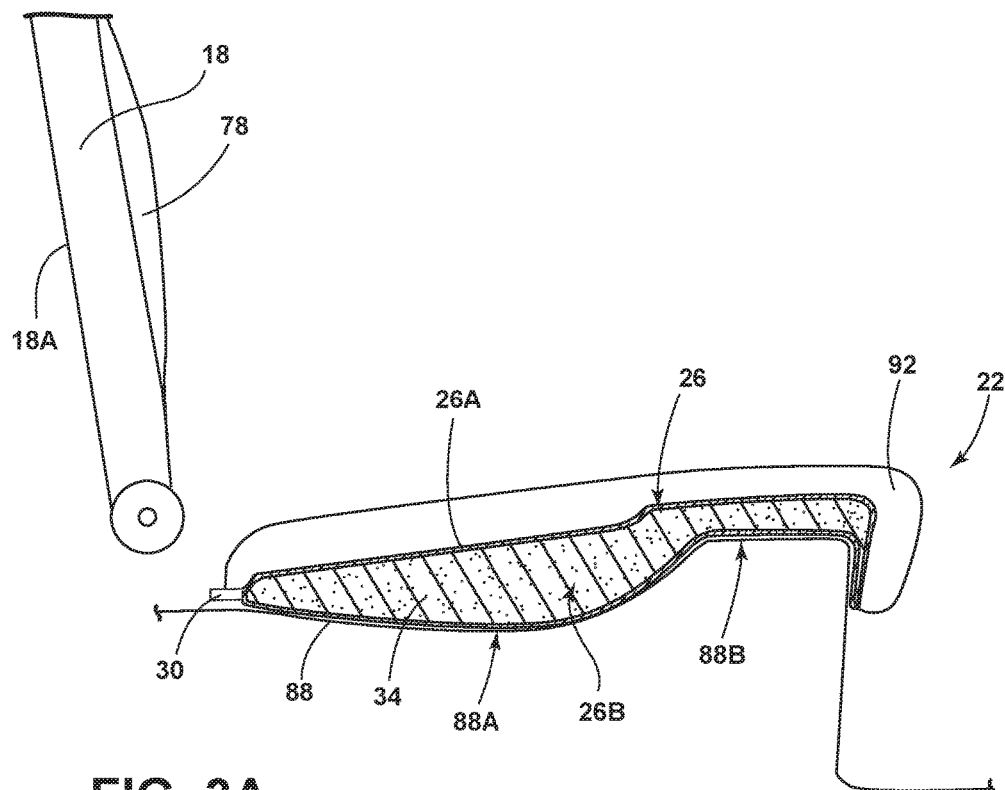
FIG. 3A is a cross-sectional view of the vehicle seating assembly, according to at least one example.
Figure 3B:
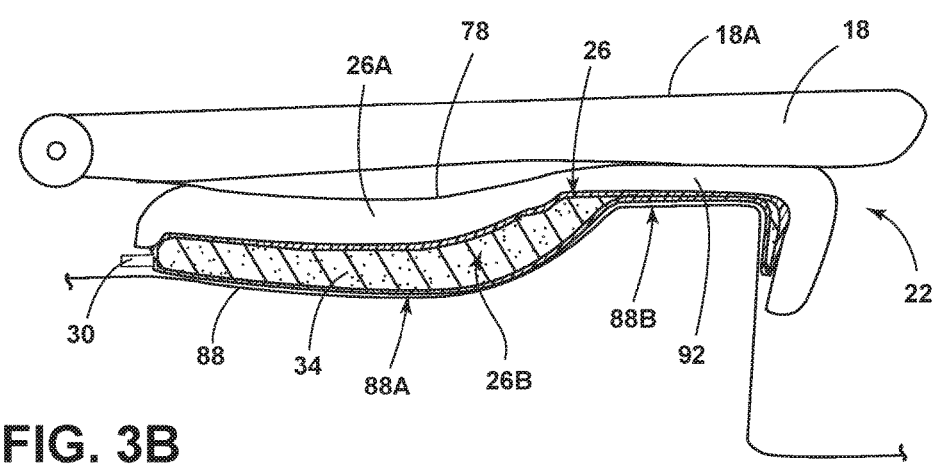
FIG. 3B is a cross-sectional view of the vehicle seating assembly, according to at least one example.

For purposes of description herein, the terms "upper," "lower," "right," "left," "rear," "front," "vertical," "horizontal," and derivatives thereof shall relate to the disclosure as oriented in FIGS. 1A and 1B. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Referring now to FIGS. 1A-4, reference numeral 10 generally designates a vehicle. Positioned within the vehicle 10 is a seat assembly 14. The seat assembly 14 includes a seatback 18 defining a loading surface 18A. The seatback 18 is operable between deployed (FIG. 1B) and undeployed (FIG. 1A) positions. A seat base 22 is positioned proximate to the seatback 18. The seat base 22 includes a bladder 26 which is operable between inflated (FIG. 3A) and deflated (FIG. 3B) states. A valve 30 is fluidly coupled with the bladder 26. A foam 34 is positioned within the bladder 26. The loading surface 18A may be substantially horizontal when the bladder 26 is deflated and the seatback 18 is in the deployed position. The vehicle 10 may further include one or more sensors 38 positioned proximate the seat assembly 14.

Referring now to FIGS. 1A and 1B, the vehicle 10 includes a passenger cabin 50 within which the seat assembly 14 is positioned. The seat assembly 14 may be positioned in a front row or a rear row of seating. In the depicted example, the seat assembly 14 is shown as a bench seat, but it will be understood that the seat assembly 14 may take a variety of configurations including bucket seats or jump seats.

As explained above, the seat assembly 14 may include the seatback 18 and the seat base 22. The seat base 22 includes a center region 60 configured to support a majority of the weight of an occupant of the seat assembly 14. The center region 60 is flanked on its inboard and outboard sides by side bolster regions 64. For purposes of this disclosure, inboard may mean a side closer to or proximate a center of the vehicle 10 while outboard may mean a side farther from the center the vehicle 10 or closer to an exterior of the vehicle 10. The side bolster regions 64 may be elevated relative to the center region 60 to aid in centering of an occupant within the seat assembly 14. Thigh bolster regions 68 may be positioned on a vehicle forward side of the seat base 22. The thigh bolster regions 68 may be configured to elevate or raise an occupant's legs to increase comfort of the occupant.

The side and thigh bolster regions 64, 68 are configured to position the occupant of the seating assembly 14 such that a proper hip pivot point is established. The hip pivot point, referred to as h-point, is the location of the occupant's hip, when seated in the seating assembly 14, relative to a floor pan of the vehicle 10 (or to the height above the pavement level). The h-point, as generally defined by the Society of Automotive Engineers (SAE), is a mechanically hinged hip point of a three-dimensional manikin (SAE J2826 manikin), which simulates the actual pivot center of a human hip. The h-point can be thought of, roughly, as the hip joint of a $50^{th}$ percentile male occupant, viewed laterally. Additionally, the h-point location is unique to each vehicle 10 and many design criteria related to various vehicle aspects such as safety, interior packaging, visibility, and seating are based off of the h-point location.

In the depicted example, the seat assembly 14 is depicted as a rear bench seat. In such an example, the seat assembly 14 may include a plurality of seatbacks 18, while the seat base 22 may include a plurality of center regions 60, side bolster regions 64 and thigh bolster regions 68. In the rear bench seat examples, the inboard side bolster regions 64 may cooperate with, or be integrated into, a middle seat region 72. The middle seat region 72 may be raised relative to the center regions 60 of the seat assembly 14. It will be understood that the middle seat region 72 may also correspond to a location for arm rests.

Similarly to the seat base 22, the seatback 18 may define back bolsters 78 positioned on inboard and outboard sides of the seatback 18. The back bolsters 78 may aid in the proper positioning of the occupant within the seating assembly 14. The back bolsters 78 may extend outwardly, and in a vehicle forward direction, when the seatback 18 is in the undeployed position. The seatback 18 is operable between undeployed (FIG. 1A) and deployed (FIG. 1B) positions. A latch 80 is used to keep the seatback 18 in the undeployed position. The latch 80 may be a mechanical or electromechanical system configured to engage a portion seatback 18 and retain it in position while an occupant is in the seating assembly 14 or a user of the vehicle 10 otherwise desires the seatback 18 to be in an upright position. Although depicted within the seatback 18, it will be understood that the latch 80 may additionally or alternatively be positioned within a support structure 82 behind the seatback 18. The latch 80 may allow a single seatback 18 of the seat assembly 14 to pivot to the deployed position, or may allow a plurality of seatbacks 18 to move to the deployed position. Moving, or pivoting, the seatback 18 from the undeployed position to the deployed position may allow the user of the vehicle 10 to access a trunk space 84 positioned vehicle rearward of the seat assembly 14. Such access to the trunk space 84 may be advantageous in allowing a user to manipulate objects located in the trunk space 84 from within the passenger compartment 50 of the vehicle 10. Additionally or alternatively, by positioning the seatback 18 into the deployed position, objects which may otherwise not fit within the trunk space 84 of the vehicle 10 may extend onto the loading surface 18A of the seatback 18. Even further, when in the deployed position, a user may place or position objects on the loading surface 18A to increase storage within the vehicle 10.

The loading surface 18A may be a flat and rigid surface defined by a vehicle rearward surface of the seatback 18. The loading surface 18A may be configured to support objects which extend from the trunk space 84 in the passenger compartment 50. While in the deployed position, the loading surface 18A of the seatback 18 may be substantially horizontal. For example, substantially horizontal for purposes of disclosure may mean that the loading surface 18A may have an angle $\alpha$ of less than or equal to about $\pm 10°$, $\pm 9°$, $\pm 8°$, $\pm 7°$, $\pm 6°$, $\pm 5°$, $\pm 4°$, $\pm 3°$, $\pm 2°$ or less than or equal to about $\pm 1°$. The angle $\alpha$ may be measured as the angle of the loading surface 18A relative to a horizontal, or X- and Y-plane define by a floor pan of the vehicle 10 or a ground beneath the vehicle 10. As will be explained in greater detail below, the loading surface 18A of the seatback 18 may achieve the substantially horizontal position when the bladder 26 within the seat base 22 is in the deflated state.

The vehicle 10, and/or seat assembly 14, may include one or more sensors 38. The sensor 38 may be configured to detect motion of the seatback 18 (e.g., relative to the seat base 22 and/or other fixtures within the passenger compartment 50 of the vehicle 10) and/or that the seatback 18 is no longer latched to the support structure 82. The sensor 38 may be positioned within the latch 80, the support structure 82, a roof, a side pillar, a headliner, or other locations within the vehicle 10. For example, the sensor 38 may be positioned on a seatback of a front row seat. The sensor 38 may be configured to detect motion of the seatback 18 in a variety of manners. For example, the sensor 38 may be a proximity, infrared, capacitive, magnetic, force, pressure and/or mechanical trigger sensor 38. In examples where the sensor 38 is positioned within, or coupled to, the latch 80, the sensor 38 may be a force, pressure and/or mechanical trigger sensor 38. For example, the sensor 38 may be triggered once the latch 80 has been actuated which would indicate that the seatback 18 is moving from the undeployed position to the deployed position. As will be explained in greater detail below, once the sensor 38 detects motion in the seatback 18, the sensor 38 may actuate the valve 30 to allow air to exit and/or enter the bladder 26 (e.g., moving the bladder 26 from the deflated to inflated states, respectively).

Referring now to FIGS. 2A-3B, the bladder 26 is positioned between a seat pan 88 and a trim component 92 of the seat base 22. The seat pan 88 may be a metal or polymeric component of a body of the vehicle 10 and function to hold the seat base 22 at a predetermined height and location. The seat pan 88 may be curved to accommodate the bladder 26 as well as other cushioning associated with the seat base 22. The seat pan 88 may define a lower bowl portion 88A and a raised portion 88B. As will be explained in greater detail below, the bowl portion 88A of the seat pan 88 is lowered, or depressed, relative to the raised portion 88B to allow a location for the bladder 26 to retreat to in the deflated state. The raised portion 88B may function to resist "submarining" of an occupant of the seat assembly 14. The trim component 92 may be composed of a polymeric material, a fabric and/or natural material (e.g., leather). The trim component 92 may be stretched across the bladder 26 and/or other components of the seat base 22 to provide an aesthetically pleasing look and feel to the seat base 22. According to various examples, the trim component 92 may be compressible. It will be understood that the seat base 22 may include one or more other components (e.g., ventilation unit, heating element, springs, comfort carriers, massage units) without departing from the teachings provided herein.

The seat base 22 may include one or a plurality of bladders 26 positioned through the seat base 22. In the depicted example, the bladder 26 extends within the side and thigh bolster regions 64, 68 of the seat base 22 such that the bladder 26 extends around a portion of a perimeter of the seat base 22. Further, the bladder 26 may extend through the middle seat region 72 where present. In examples utilizing multiple bladders 26, each of the side and thigh bolster regions 64, 68 of the seat base 22 may include a separate bladder 26 (e.g., shown in phantom). In such examples, each of the bladders 26 may be isolated from one another such that a gas within one of the bladders 26 may not travel into another bladder 26. In yet other examples, each of the side and thigh bolster regions 64, 68 may contain separate bladders 26 which are fluidly coupled with one another. The bladder(s) 26 is positioned between the seat pan 88 and the trim component 92. The bladder 26 extends over the bowl and raised portions 88A, 88B of the seat pan 88. The bladder 26 may be thicker, or larger, proximate the bowl portion 88A of the seat pan 88 relative to the portion of the bladder 26 proximate the raised portion 88B. As will be explained in greater detail below, by positioning a majority of the bladder 26 over the bowl portion 88A of the seat pan 88, a height of the seat base 22 may be greatly decreased when the bladder 26 is in the deflated state thereby allowing the back bolsters 78 to mate with the seat base 22 and provide the loading surface 18A with the substantially horizontal orientation.

The bladder 26 of the seat base 22 is operable between inflated (FIG. 3A) and deflated (FIG. 3B) states. The bladder 26 may be composed of a polymeric and/or elastomeric liner 26A. The liner 26A may be airtight such that gas may not permeate across the liner 26A of the bladder 26. According to various examples, the liner 26A may be configured to expand, or stretch, when inflated. The liner 26A of the bladder 26 defines a bladder cavity 26B within which air may be stored. Air pressure within the bladder cavity 26B of the bladder 26 may inflate the bladder 26 (e.g., to the inflated state of FIG. 3A) to a predetermined size and provide the side and/or thigh bolster regions 64, 68 a predetermined or designed resiliency. In the inflated state, the bladder 26 may aid in providing a desired support or design to the seat base 22. For example, while inflated the bladders 26 may maintain the side and thigh bolster regions 64, 68 at a predetermined height and configuration to maintain the h-point of the occupant of the seat assembly 14 as well as provide comfort and support. Transition of the bladders 26 from the inflated state to the deflated state may cause a decrease in a height of the thigh bolster regions 68 as well as a decrease in height of the side bolster regions 64. Put another way, the resiliency of the bladders 26 may be reduced by a decrease in air within the bladder cavities 26B such that force applied to the side and thigh bolster regions 64, 68 (e.g., but the seatback 18 moving to the deployed position) cause the side and thigh bolster regions 64, 68 to decrease in size or retreat toward seat pan 88.

The foam 34 is positioned within the bladder cavity 26B of the bladder 26. The foam 34 may have a shape substantially similar to that of the bladder 26 and/or side and thigh bolster regions 64, 68 while in the inflated state. The foam 34 may be configured to be compressed or crushed to a compacted state, and recover, or expand, to a size and shape substantially similar to that before the foam 34 was compressed. The foam 34 may be composed of a polyurethane material that is sensitive to pressure and temperature (e.g., a memory foam), an elastomeric foam, an expanded polystyrene, an expanded polypropylene, polymeric materials, composite materials and/or combinations thereof. The foam 34 may have a closed-cell and/or open-cell configuration. According to various examples, the foam 34 may be configured to expand the liner 26A of the bladder 26 to the inflated state. In other words, the foam 34 may recover in size once compressed such that the foam 34 is the driving force to transition the bladder 26 from the deflated state to the inflated state. In use, the foam 34 of the bladder 26 may be compressed while the seatback 18 is transitioning to the deployed state. For example, the back bolsters 78 of the seatback 18 may contact the side and thigh bolster regions 64, 68 of the seat base 22. Such contact may be configured to compress the foam 34 and allow the seatback 18 to reach the substantially horizontal orientation as described above. According to various examples, the foam 34 may be configured to have a compression strength low enough that the foam 34 is configured to compress under a weight of the seatback 18. Put another way, the weight of the seatback 18 may be adequate to compress the foam 34 to reach a sufficient equilibrium which orientates the loading surface 18A in the substantially horizontal orientation.

The valve 30 may be fluidly coupled with the bladder 26 to allow air to pass into, and out of, the bladder cavity 26B of the bladder 26. A single valve 30, or a plurality of valves 30, may be fluidly connected to the bladder 26. One or more valves 30 may be fluidly coupled to each of the bladders 26 in examples of the seat base 22 incorporating multiple bladders 26. The valves 30 may be configured to draw gas for the bladder(s) 26 from ambient surroundings, or the gas may be supplied from a tank or compressor. The valves 30 may be actuated between open and closed states based on a signal from the sensor 38 and/or latch 80 which detects motion of the seatback 18. For example, as the sensor 38 detects motion of the seatback 18 between the undeployed and deployed positions, the sensor 38 may actuate the valve 30 to allow air within the bladder 26 to pass through the valve 30. In other words, when the sensor 38 detects the motion of the seatback 18, the valve 30 may be opened to allow the bladder 26 to expel and intake gas to allow the bladder 26 to transition between the deflated and inflated states. It will be understood that a pump may be coupled to the valve 30 to draw gas from the bladder 26 and/or to inflate the bladder 26. The sensor 38 may be configured to actuate the valve 30 to the closed position once the seatback 18 has returned to the undeployed position (e.g., by detecting no more motion of the seatback 18, detecting the position and/or in conjunction with the actuation of the latch 80). In other words, once the seatback 18 is in the undeployed position, the valve 30 may seal the bladder 26 such that the bladder 26 provides resiliency to the seat base 22 and does not compress. It will be understood that the valve 30 may additionally or alternatively be actuated based on the actuation of the latch 80.

In operation, a user of the seat assembly 14 moves the seatback 18 from the undeployed position to the deployed position by unlatching the seatback 18 at the latch 80 and pivoting the seatback 18 toward the seat base 22. The valve 30 may be actuated to the open position once the sensor 38 detects motion of the seatback 18 and/or once the latch 80 is released. As the seatback 18 approaches the seat base 22, the back bolsters 78 of the seatback 18 begin to make contact with raised areas (e.g., the side and thigh bolster regions 64, 68) of the seat base 22. The weight of the seatback 18, along with any downward force provided by the user, begins to force gas from within the cavity 26B of the bladder 26 and through the valve 30 to transition the bladder 26 from the inflated state to the deflated state. Further, the weight of the seatback 18, along with any downward force provided by the user, begins to compress the foam 34 within the cavity 26B. The weight of the seatback 18 may reach equilibrium with the resiliency of the foam 34 when the loading surface 18A of the seatback 18 is in the substantially horizontal position. Once the user is done accessing the trunk space 84 and/or using the loading surface 18A, the user may begin moving the seatback 18 toward the undeployed position. The foam 34 may begin to expand, or recover, to its initial shape and size as the weight of the seatback 18 is removed from the foam 34. Such recovery of the foam 34 provides a force against the bladder liner 26A to draw gas into the bladder cavity 26B and transition the bladder 26 back to the inflated state. Inflation of the bladder 26 may cause the height of the side and thigh bolster regions 64, 68 to return to a predetermined or design height. Once the seatback 18 has returned to the undeployed position (e.g., as measured by the sensor 38 and/or by actuation of the latch 80) the valve 30 is closed such that the bladder 26 is sealed. Sealing of the bladder 26 allows the side and thigh bolster regions 64, 68 to become resilient and aid in maintaining the h-point of an occupant of the seat assembly 14.

Figure 4:
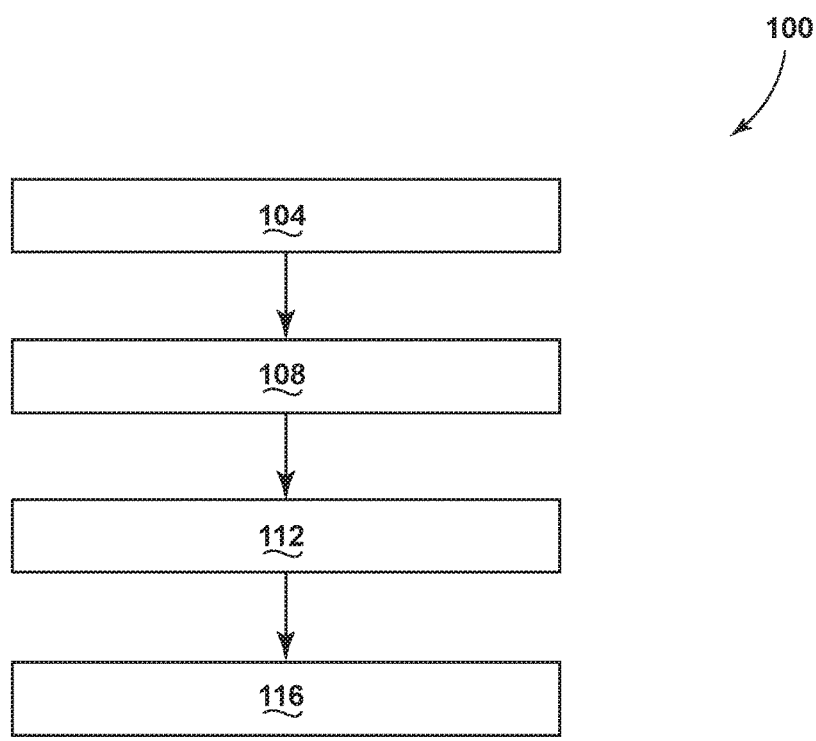
FIG. 4 is a flow diagram, according to at least one example.

Referring now to FIG. 4, an exemplary method 100 of operating the seat assembly 14 is provided. The method 100 may begin with a step 104 of moving the seatback 18 from an undeployed position to a deployed position. As disclosed above, the undeployed position may be with the seatback 18 substantially in a substantially vertical orientation and the loading surface 18A of the seatback 18 may be substantially horizontal in the deployed position. Next, a step 108 of actuating the valve 30 to deflate the bladder 26 within the seat base 22 proximate to the seatback 18 may be performed. As explained above, when the sensor 38 and/or latch 80 detects movement of the seatback 18 between the deployed and undeployed positions, the valve 30 may be actuated to allow gas to be evacuated from the bladder cavity 26B. For example, the gas within the cavity 26B may be evacuated by pressing the seatback 18 against the seat base 22 such that the gas within the bladder 26 is forced out through the valve 30. Next, a step 112 of latching the seatback 18 in the undeployed position may be performed. Next a step 116 of actuating the valve 30 to seal the bladder 26 is performed. As explained above, detection (e.g., by the sensor 38 and/or latch 80) of the seatback 18 in the undeployed position may cause the valve 30 to actuate shut, or closed, to seal the bladder 26. The method 100 may further include the step of compressing the foam 34 within the bladder 26 under a weight of the seatback 18. As explained above, the weight of the seatback 18, as it moves to the deployed position, may be sufficient to compress the foam 34 within the bladder 26. The method 100 may further include a step of recovering, or expanding, the foam 34 to inflate the bladder 26. As explained above, the foam 34 positioned within the bladder cavity 26B is configured to recover after compression to drive the bladder 26 from the deflated state to the inflated state. In the process, air is drawn through the open valve 30 to allow the bladder 26 to inflate. The method 100 may further include the step of positioning the loading surface 18A of the seatback 18 in a substantially horizontal orientation. As explained above, the transition of the bladder 26 to the deflated state may decrease a height of the side and thigh bolster regions 64, 68 of the seat base 22 to allow sufficient space for the loading surface 18A to be substantially horizontal.

Use of the present disclosure may offer a variety of advantages. First, use of the disclosed seat assembly 14 may allow the loading surface 18A of the seatback 18 to obtain a substantially horizontal orientation. Horizontal orientation of the loading surface 18A may be advantageous in allowing cargo which extends from the trunk space 84 to the passenger compartment 50 to lay flat while being transported. Further, the horizontal orientation of the loading surface 18A may allow cargo and objects to be stored on top of the loading surface 18A with minimal and/or no sliding. Second, use of the bladder 26 allows for a seat assembly 14 which may both deflate to accommodate the seatback 18 and inflate to provide the proper h-point to an occupant of the seat assembly 14.

According to various embodiments, a vehicle includes a seatback defining a loading surface and is operable between deployed and undeployed positions. A seat base is positioned proximate the seatback. A bladder is operable between inflated and deflated states. A valve is fluidly coupled with the bladder. Foam is positioned within the bladder. The loading surface is substantially horizontal when the bladder is deflated and the seatback is in the deployed position. Embodiments of the vehicle can include any one or a combination of the following features:

- the loading surface is at an angle relative to a horizontal plane of less than about 10°;
- the loading surface is at an angle relative to a horizontal plane of less than about 5°;
- the loading surface is at an angle relative to a horizontal plane of less than about 1°;
- the bladder is positioned between a seat pan and a trim component;
- the foam is configured to expand the bladder to the inflated state;
- the valve is configured to be actuated by a sensor which detects motion of the seatback;
- the bladder is positioned in a side bolster region of the seat base;
- the bladder is positioned in a thigh bolster region of the seat base;
- the valve is configured to allow air to pass in and out of the bladder;
- the foam is configured to expand the bladder to the inflated state; and/or
- the foam is configured to compress under a weight of the seatback.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A vehicle, comprising:
   a seatback defining a loading surface and operable between deployed and undeployed positions, wherein the seatback is coupled to a support structure positioned behind the seatback by a latch; and
   a seat base is positioned proximate the seatback, comprising:
      a seat pan having a lower bowl portion and a raised portion;
      a bladder positioned partially within the lower bowl portion and partially above the raised portion, operable between inflated and deflated states;
      a valve fluidly coupled with the bladder; and
      a sensor configured to be triggered by the latch and actuate the valve.

2. The vehicle of claim 1, wherein the loading surface is at an angle relative to a horizontal plane of less than about 10° when the seatback is in the deployed position.

3. The vehicle of claim 2, wherein the loading surface is at an angle relative to a horizontal plane of less than about 5° when the seatback is in the deployed position.

4. The vehicle of claim 3, wherein the loading surface is at an angle relative to a horizontal plane of less than about 1° when the seatback is in the deployed position.

5. The vehicle of claim 1, wherein the bladder is positioned between the seat pan and a trim component.

6. The vehicle of claim 1, wherein a foam is configured to expand the bladder to the inflated state.

7. The vehicle of claim 1, wherein the bladder is positioned in a side bolster region of the seat base.

8. The vehicle of claim 7, wherein the bladder is positioned in a thigh bolster region of the seat base.

9. A vehicle, comprising:
   a seatback comprising a latch configured to operate the seatback between deployed and undeployed positions;
   a seat base positioned proximate the seatback, comprising:
      a seat pan having a curved lower bowl portion and a raised substantially horizontal portion;
      a bladder partially disposed within the curved lower bowl portion of the seat pan and partially disposed above the raised substantially horizontal portion of the seat pan, operable between inflated and deflated states; and
      a valve fluidly coupled with the bladder; and
   a sensor configured to be triggered by the latch and actuate the valve to drive the bladder between the inflated and deflated states.

10. The vehicle of claim 9, wherein the valve is configured to allow air to pass in and out of the bladder.

11. The vehicle of claim 9, further comprising:
    a foam positioned within the bladder, wherein the foam is configured to expand the bladder to the inflated state.

12. The vehicle of claim 11, wherein the foam is configured to compress under a weight of the seatback.

13. The vehicle of claim 9, wherein the bladder extends around a portion of a perimeter of the seat base.

14. A vehicle seat folding method, comprising the steps:
    actuating a latch to move a seatback between undeployed and deployed positions;
    triggering a sensor through actuating the latch to open a valve to deflate a bladder positioned within a curved bowl portion and above a raised portion of a seat pan and within a seat base coupled to the seatback;
    latching the seatback in the undeployed position; and
    actuating the valve to seal the bladder.

15. The method of claim 14, further comprising the step of:
    expanding a foam within the bladder to expand the bladder.

16. The method of claim 14, further comprising the step of:
    compressing a foam within the bladder under a weight of the seatback.

17. The method of claim 14, further comprising the step of:
    positioning a loading surface of the seatback in a substantially horizontal orientation.

18. The method of claim 14, further comprising the step of:
    decreasing a height of a thigh bolster region of the seat base.

19. The method of claim 14, further comprising the step of:
  decreasing a height of a side bolster region of the seat base.

* * * * *